United States Patent
Gresset et al.

(10) Patent No.: US 11,006,580 B2
(45) Date of Patent: May 18, 2021

(54) ENVELOPING MATERIAL FOR A BALER

(71) Applicant: DEERE & COMPANY, Moline, IL (US)

(72) Inventors: Pascal Gresset, Auxon Dessous (FR); Frederic Perrotin, Le Tremblois (FR)

(73) Assignee: DEERE & COMPANY, Moline, IL (US)

( * ) Notice: Subject to any disclaimer, the term of this patent is extended or adjusted under 35 U.S.C. 154(b) by 164 days.

(21) Appl. No.: 16/011,744

(22) Filed: Jun. 19, 2018

(65) Prior Publication Data

US 2018/0368326 A1 Dec. 27, 2018

(30) Foreign Application Priority Data

Jun. 27, 2017 (DE) .................... 102017210848.7

(51) Int. Cl.
| | | |
|---|---|---|
| *A01F 15/07* | (2006.01) | |
| *B65D 65/12* | (2006.01) | |
| *A01F 15/08* | (2006.01) | |
| *B65D 65/14* | (2006.01) | |

(52) U.S. Cl.
CPC ............ *A01F 15/071* (2013.01); *A01F 15/08* (2013.01); *B65D 65/12* (2013.01); *A01F 2015/0745* (2013.01); *A01F 2015/0755* (2013.01); *B65D 65/14* (2013.01); *B65H 2701/1944* (2013.01)

(58) Field of Classification Search
CPC .... A01F 15/071; A01F 15/08; A01F 15/0825; A01F 15/0715; A01F 25/14; A01F 25/13; A01F 2025/142; A01F 2015/0745; A01F 2015/0755; A01F 2015/072; A01F 2015/074; A01D 90/08; B65B 9/10; B65B 35/243; B65B 35/44; B65B 39/02; B65B 39/08; B65B 51/043; B65B 51/046; B65B 41/18; B65B 11/04; B65B 25/02; B65B 27/125; B65D 65/12; B65D 65/14; B65D 65/08; B65D 65/16; B65H 2701/1944
USPC ......... 53/587, 441, 450, 461, 465, 547, 552, 53/556, 203, 118, 211, 214, 399, 207, 53/208; 229/87.01, 87.05; 428/99, 100, 428/134–136, 43; 206/83.5
See application file for complete search history.

(56) References Cited

U.S. PATENT DOCUMENTS

| | | | | |
|---|---|---|---|---|
| 536,797 | A * | 4/1895 | Young | B65D 65/22 229/92 |
| 3,490,123 | A * | 1/1970 | Clark | F24C 15/00 428/572 |
| 3,509,007 | A * | 4/1970 | Kalwaites | B26F 1/24 428/132 |

(Continued)

FOREIGN PATENT DOCUMENTS

| | | | | |
|---|---|---|---|---|
| DE | 3525294 A1 * | 1/1987 | | D04B 21/12 |
| EP | 0304104 A1 | 2/1989 | | |
| GB | 2348633 A * | 10/2000 | | A01F 15/0715 |

OTHER PUBLICATIONS

German Search Report issued in counterpart application No. 102017210848.7 dated Feb. 19, 2018. (10 pages).

(Continued)

*Primary Examiner* — Stephen F. Gerrity
*Assistant Examiner* — Joshua G Kotis

(57) ABSTRACT

An enveloping material for a baler for enveloping a lateral surface of a bale includes a piece of material having at least one entrainer.

9 Claims, 4 Drawing Sheets

(56) References Cited

U.S. PATENT DOCUMENTS

| | | | | |
|---|---|---|---|---|
| 4,167,131 | A * | 9/1979 | Habas | B26F 1/24 83/304 |
| 4,248,343 | A * | 2/1981 | Schaefer | A01F 25/13 150/154 |
| 4,569,439 | A * | 2/1986 | Freye | A01F 15/0715 100/15 |
| 4,703,605 | A * | 11/1987 | Ackermann | A01F 15/07 53/118 |
| 4,917,008 | A * | 4/1990 | van den Wildenberg | A01F 15/0715 100/5 |
| 6,933,030 | B1 * | 8/2005 | Paterni | E06B 3/80 160/115 |
| 7,093,406 | B2 * | 8/2006 | Anstey | A01F 15/0715 53/397 |
| 7,331,279 | B2 * | 2/2008 | Biziorek | A01F 15/07 100/48 |
| 7,636,987 | B2 * | 12/2009 | Derscheid | A01F 15/0715 24/16 R |
| 8,298,640 | B2 * | 10/2012 | Cattacin | A47K 10/42 428/43 |
| 10,257,986 | B1 | 4/2019 | Porter et al. | |
| 2004/0121108 | A1 * | 6/2004 | Mass | A01F 15/071 428/57 |
| 2004/0221547 | A1 * | 11/2004 | Anstey | A01F 15/0715 53/399 |
| 2009/0272072 | A1 * | 11/2009 | Paillet | A01F 15/0715 53/118 |
| 2010/0239805 | A1 | 9/2010 | Goering | |
| 2013/0221078 | A1 | 8/2013 | Skelton | |
| 2014/0352263 | A1 | 12/2014 | Harchol et al. | |
| 2016/0137372 | A1 * | 5/2016 | Anstey | A01F 15/0715 428/190 |
| 2016/0280404 | A1 | 9/2016 | Porter et al. | |
| 2017/0359960 | A1 * | 12/2017 | Reijersen van Buuren | A01D 87/127 |

OTHER PUBLICATIONS

European Search Report issued in counterpart application No. 18170544.3 dated Nov. 7, 2018. (6 pages).

German Search Report issued in counterpart application No. 102017210847.9 dated Feb. 19, 2018 (10 pages).

European Search Report issued in counterpart European Patent Application No. 18170534.4 dated Nov. 7, 2018 (6 pages).

* cited by examiner

ENVELOPING MATERIAL FOR A BALER

RELATED APPLICATIONS

This application claims priority to German Patent Application Ser. No. 102017210848.7, filed Jun. 27, 2017, the disclosure of which is hereby incorporated by reference in its entirety.

FIELD OF THE DISCLOSURE

The present disclosure relates to an enveloping material for a baler, in particular an agricultural baler for forming in particular round cylindrical bales, for enveloping at least substantially a lateral surface of a bale.

BACKGROUND

Conventional enveloping devices are used on round balers in order to wrap a round bale formed in a pressing chamber of the round baler with an enveloping material such as, for example, a net, a film or a similar, optionally also semipermeable, breathable or water-repellent material, before said bale is discharged from the round baler after enveloping is complete and then laid on the ground or is transferred to a further device, for example, a wrapping device.

Round balers of this kind are used both in the agricultural and the industrial sectors. Corresponding agricultural balers serve, for example, to form bales of harvested material and produce frequently at least substantially round cylindrical bales from harvested material, for example, of the straw, hay, chopped material etc. Industrial balers are used in the compaction of waste, textiles or other materials, and in the pressing thereof to form bales.

When a bale is enveloped with enveloping material, it is possible, in particular under unfavorable harvesting conditions, for the enveloping material not to be grasped or not to be grasped correctly by the bale at the start of an enveloping operation, or for the enveloping material to wrap around pressing means of a baler. As a result, it is possible for obstructions to arise or for the bale not to be enveloped or to be enveloped only incompletely, this frequently being noticed by an operator only after the bale has been discharged from the baler.

SUMMARY

If an enveloping material for a baler for enveloping at least substantially the lateral surface of a bale has at least one entrainer, the latter can make it easier for the enveloping material to be grasped by the bale or improve this, for example, in that it interacts with the material from which the bale is formed or is grasped thereby. However, the entrainer can, for example, also be grasped by or interact with a feed device for the enveloping material, for example a feed lever provided in a pivotable manner on an enveloping device. In this way, the feed of the enveloping material to a bale or grasping of the enveloping material by the bale can be improved or supported or wrapping of pressing means or other working means or components of the baler can be counteracted or prevented. Furthermore, the entrainer can determine the position of the enveloping material or a portion of the enveloping material with regard to the feed device such that during each enveloping operation the bale is wrapped by at least substantially the same quantity of enveloping material or the length of a portion of the enveloping material that follows on the feed device is at least substantially the same for each enveloping operation. The baler may be an agricultural baler for forming round cylindrical bales. The baler can also be used in the industrial sector, however, in order to form bales of paper, waste, fabric or other materials. It is furthermore conceivable for it to be a baler for producing square bales, as are used both in the agricultural and the industrial sectors.

If a plurality of entrainers are provided, they are arranged approximately in a row transversely to a delivery direction F across the width B of the enveloping material. This favors grasping or delivery of the enveloping material across its entire width. However, it is also conceivable to provide the entrainers only in peripheral regions of the enveloping material or to provide the entrainers or only one entrainer in a central region of the enveloping material.

It is conceivable for the at least one entrainer to be embodied so as to protrude in the manner of a protrusion, a thickening or in some other way. In particular, however, the entrainer is configured as a cutout. Such a configuration can interact in a particularly simple and effective manner with the bale or a material forming the latter, in that stalks or other materials or material portions projecting from the bale engage in the cutouts. In particular, the cutout(s) is/are configured at least approximately in a round, oval or elongate manner.

If the at least one entrainer is arranged in a portion of the enveloping material that is at least substantially automatically separable with regard to a longitudinal extent of the enveloping material, the entrainer can improve or support a feed of each portion or grasping of each portion by the bale, or counteract or prevent wrapping of pressing means or other working means or components of the baler by enveloping material or a portion of the enveloping material and thus counteract or prevent blocking of an enveloping device. In particular, the at least one entrainer is arranged in a starting region of the portion. If at least one predetermined tearing region is provided between portions, a portion wrapped around or enveloping the bale can easily be separated from a portion running behind, or be separated from the rest of the enveloping material, arranged or wound in particular on a supply roll, without the use of a separating device or a cutter arrangement being absolutely necessary.

If the entrainer is arranged in a folding region of the enveloping material and within lateral regions of a folding region, the entrainer can be protected by the folding region or by the lateral regions from environmental influences or in particular premature interaction being grasped by the bale or the material thereof. Provision can be made for the entrainer to be freed up by the folding region or the lateral region only when the folding region or the lateral regions have unfolded at least substantially fully, following completion of an enveloping operation.

If the folding region engages over each particular predetermined tearing region, premature or undesired separation of the portions can be prevented or counteracted.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
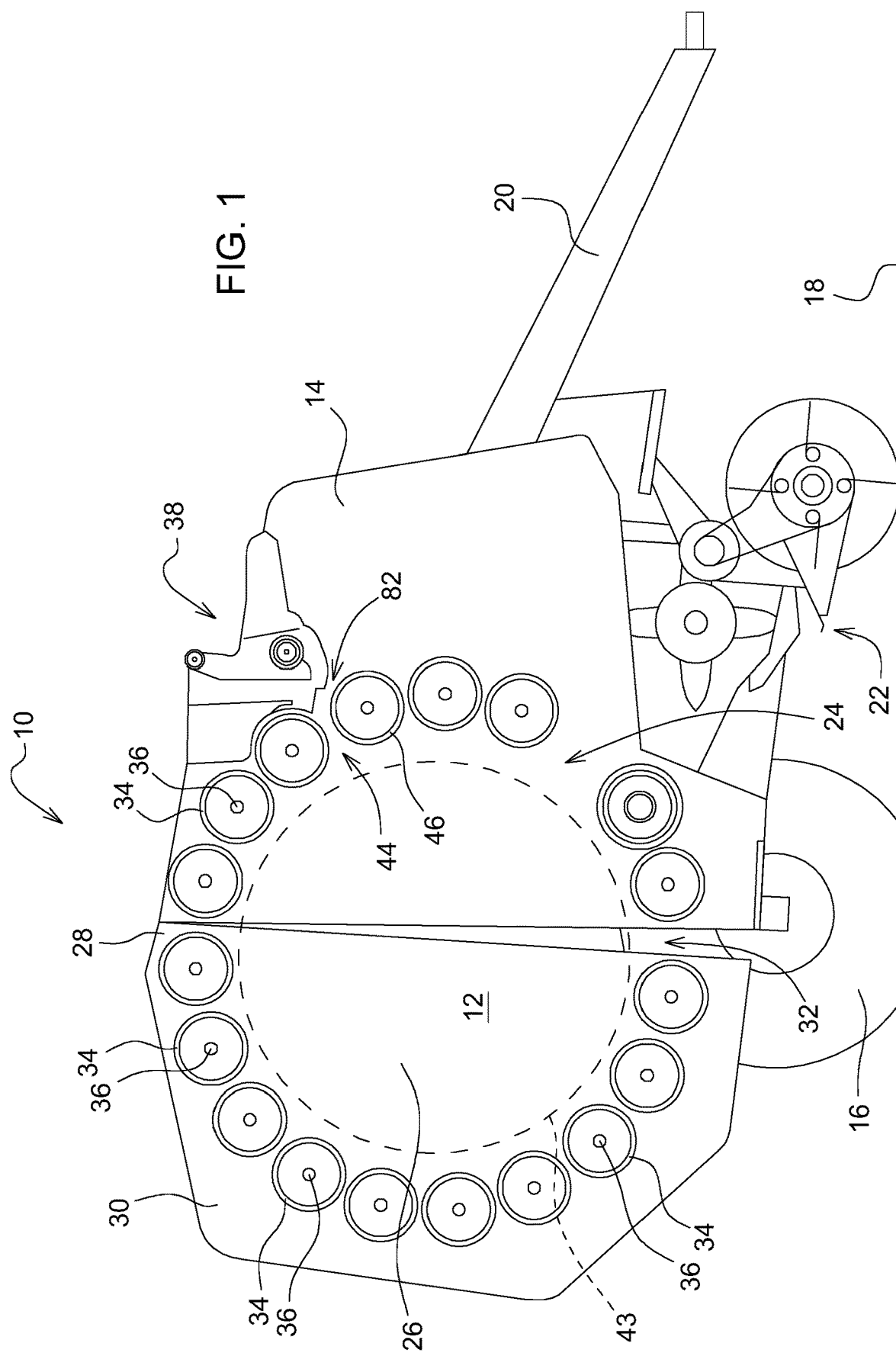
FIG. 1 is a schematic side view of an agricultural baler with pressing means and an enveloping device.
Figure 2:
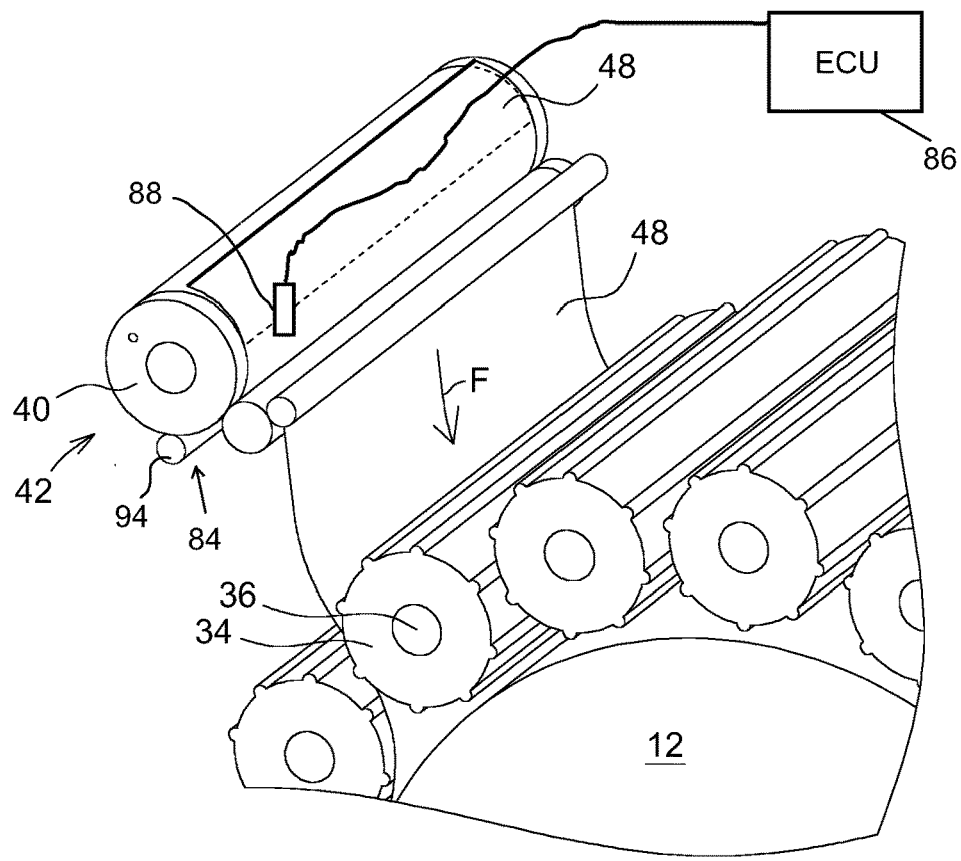
FIG. 2 is an enlarged illustration of the enveloping device with an enveloping material wound on a supply roll, during the enveloping of a bale with enveloping material.

FIG. 1 shows a schematically illustrated baler 10, of the agricultural baler type for pressing a round cylindrical bale 12, the baler having a first housing part 14 which is supported on the ground 18 by means of wheels 16 and which is attachable to a towing vehicle (not shown) such as a tractor by means of a drawbar 20.

Located in a known manner on a front, with regard to a direction of forward travel, lower side of the first housing part 14 is a receiving apparatus 22 for receiving and feeding harvested material, the receiving apparatus 22 delivering cut harvested material into a pressing chamber 26 through a feed duct 24, wherein the first housing part 14 surrounds a front part of the pressing chamber 26. Located in the rear upper corner region of the first housing part 14 is a bearing 28 for a pivotable second housing part 30, which surrounds a rear part of the pressing chamber 26. In the opened state, the second housing part 30 uncovers an opening 32 through which a bale 12 pressed by the baler 10 can be deposited, unloaded or ejected. The pivotable second housing part 30 can be actuated (opened and closed) by means of actuators (not shown) and thus represents an outlet flap for a bale 12 pressed in the pressing chamber 26.

According to the illustrated embodiment, the pressing chamber 26 of the baler 10 is configured with an invariable size and the baler 10 has a multiplicity of pressing rollers 34 that extend parallel to one another (by way of example, only a few pressing rollers 34 are shown), the axes of rotation 36 of which lie on a circular arc with the second housing part 30 closed, and at least some of which are driven. In addition to pressing and shaping, the pressing rollers 34 also serve to set or keep the round bale 12 arranged in the pressing chamber 26 in rotation. The baler 10 is depicted with a slightly open second housing part 30 here by way of example to illustrate the opening 32. During a pressing operation, said second housing part 30 is closed, however.

Furthermore, the baler 10 comprises an enveloping device 38, which is equipped with a supply roll 40 for enveloping material 42. The supply roll 40 feeds the enveloping material 42 to the pressing chamber 26 through a feed gap 44. Provided directly beneath the feed gap 44, or adjoining the latter, is a feed roll 46 which, apart from its position, is identical to the other pressing rollers 34 and can be driven in rotation therewith via a drive (not shown).

Following completion of the actual baling operation, i.e., the reception of harvested material and the formation of a bale 12 by the pressing rollers 34, travel over the ground 18 is interrupted since the baler 10 is filled with the bale 12 and no further harvested material should or can be received in the pressing chamber 26. At this time, the enveloping device 38 is also activated, an enveloping operation following the baling operation is initiated and the enveloping material 42 is guided from the supply roll 40 through the feed gap 44 into the pressing chamber 26 and onto the bale 12. By sustained rotation of the bale 12 located in the pressing chamber 26, the enveloping material 42 is wrapped around the bale 12 such that it envelops a lateral surface 43 of the bale 12. Once the enveloping operation has been concluded, the bale 12 is deposited on the ground 18 through the opening 32 via an unloading ramp (not shown) by means of the second housing part 30 that acts in the manner as an outlet flap being opened. The baler 10 then resumes traveling and a new baling operation starts.

Reference is now made to FIGS. 2 to 5 of the drawing, in which the enveloping device 38 and the enveloping material 42 are shown in an enlarged illustration. The enveloping device 38 is configured basically in a known manner according to the present embodiment. The enveloping material 42 is fed to the feed gap 44 such that it is grasped by the driven feed roll 46 and delivered in the direction of the bale 12. According to the present embodiment, the enveloping material 42 is guided at least substantially from above onto the feed roll 46, with the result that it can be grasped and entrained thereby easily (see FIG. 2).

Figure 3:
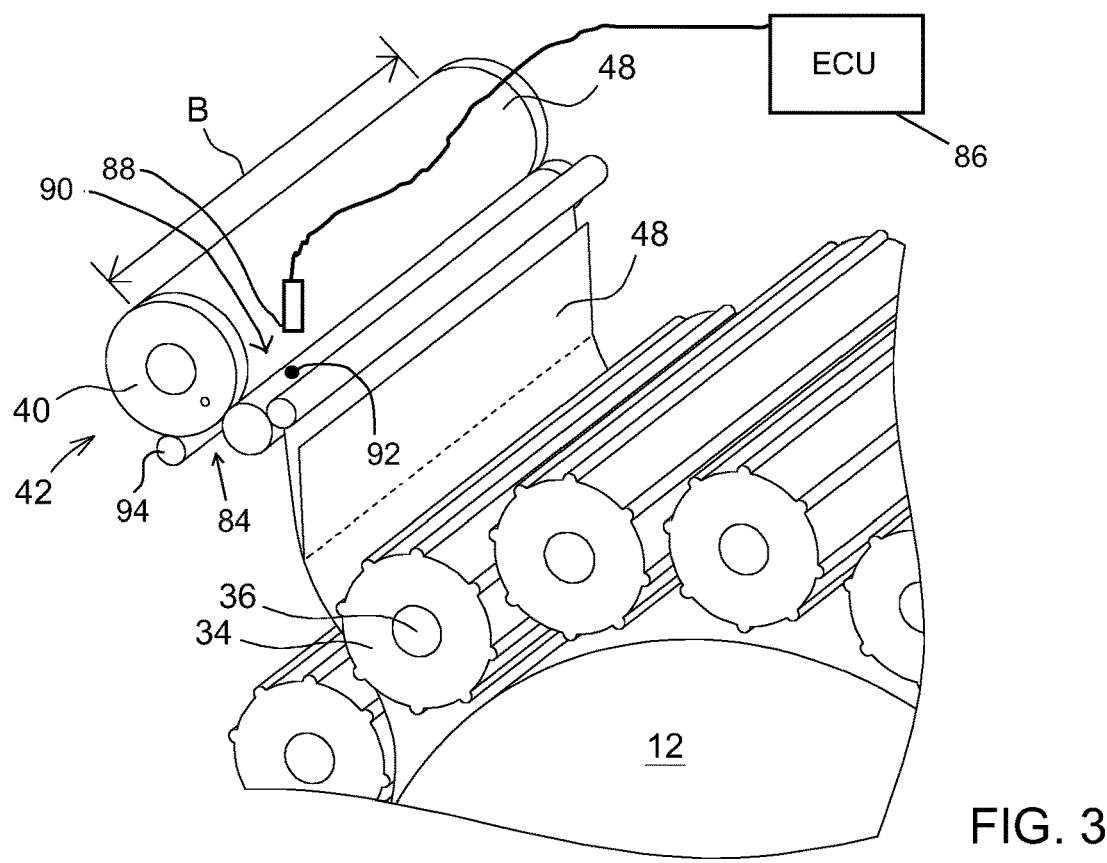
FIG. 3 is an illustration as per FIG. 2 toward the end of the enveloping operation, wherein the bale is already completely wrapped with enveloping material.
Figure 4:
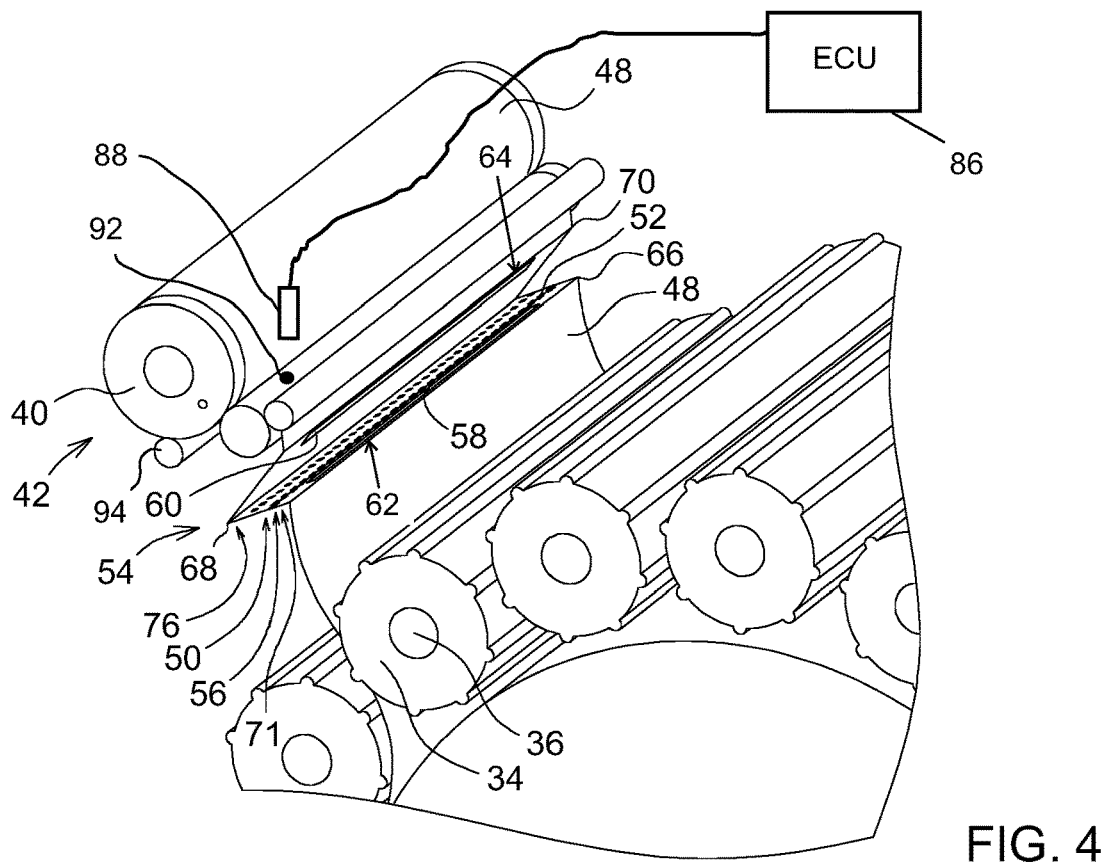
FIG. 4 is an illustration as per FIGS. 2 and 3, wherein a folding region of the enveloping material is starting to unfold.
Figure 5:
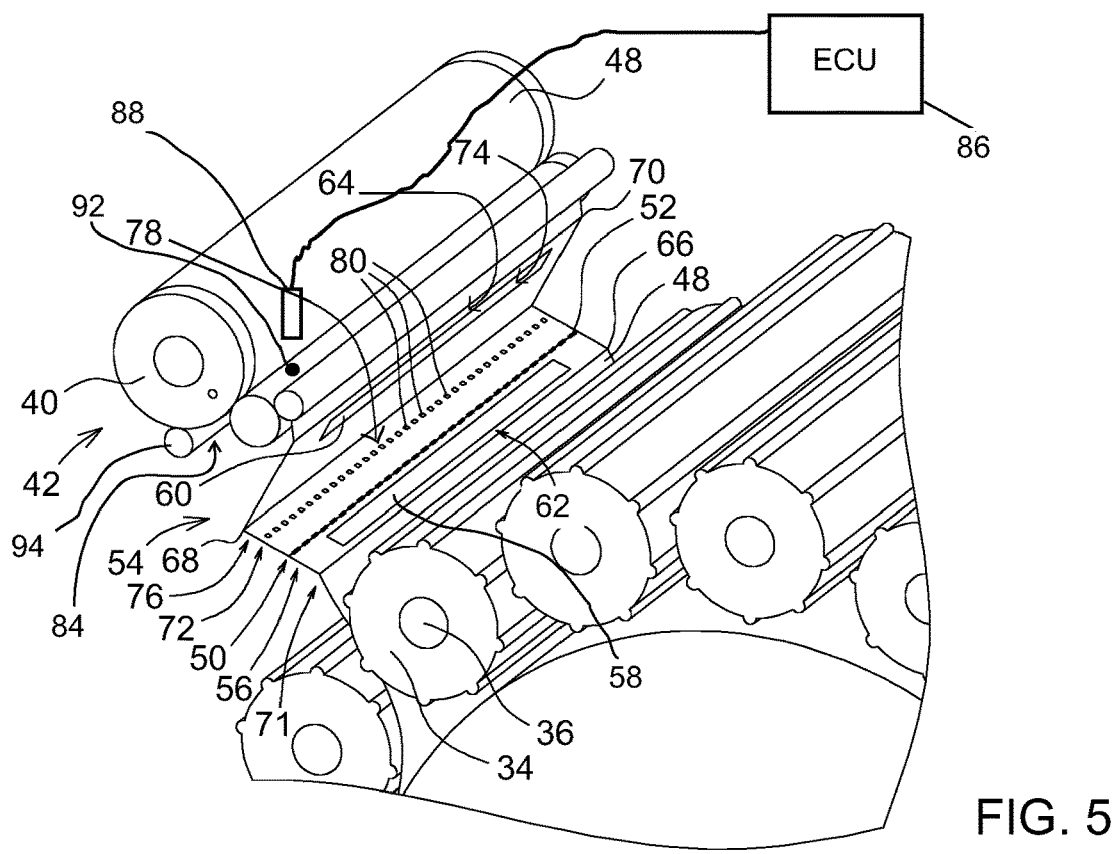
FIG. 5 is an illustration as per FIG. 4 with an almost completely unfolded folding region.
Figure 6:
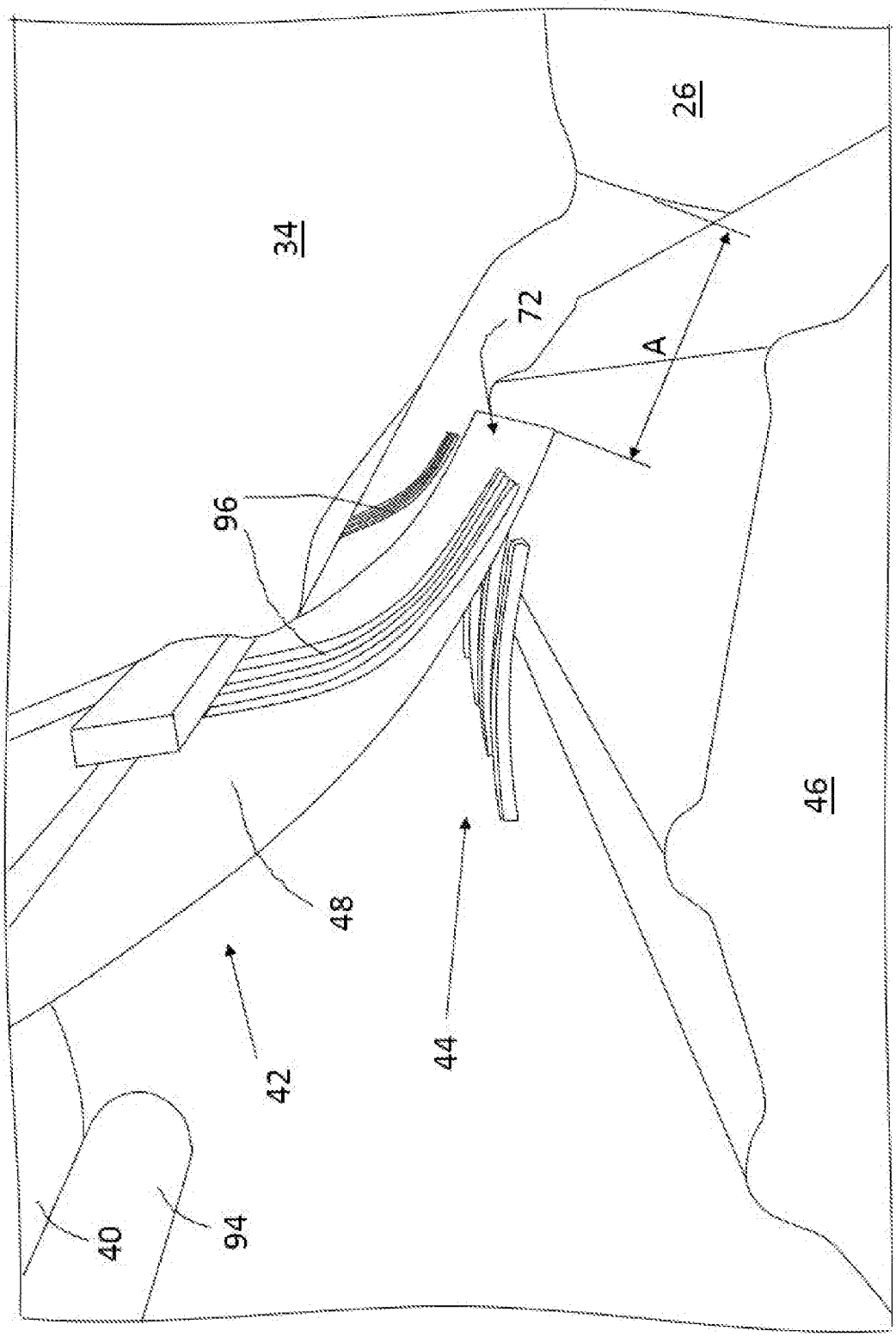
FIG. 6 is an illustration of a starting region, arranged in a feed gap, of the enveloping material.

FIGS. 3 to 5 show the enveloping device 38 and the enveloping material 42 now in successive phases of an enveloping operation. According to FIG. 3, the bale 12 is now almost completely enveloped with enveloping material 42 and the enveloping operation is nearly complete. Looking at the supply roll 40, it is clear that the enveloping material 42 is subdivided into portions 48 in the longitudinal direction such that in each case one portion 48 is used for enveloping a bale 12, wherein predetermined tearing regions 50 are provided between the portions 48. According to the present embodiment, these predetermined tearing regions 50 are embodied in the manner of perforation lines 52 that extend across the width B of the enveloping material 42.

Furthermore, the enveloping material 42 has folding regions 54 and adhesive regions 56, wherein the adhesive regions 56 each have two adhesive components 58, 60 configured in the manner of adhesive strips. These adhesive components 58, 60 are in turn attached to the enveloping material 42 by means of further adhesive components 62, 64 that are shown only by way of indication.

The folding regions 54 each have a first, a second and a third folding edge 66, 68, 70, which are provided one after another with respect to the delivery direction F. The first folding edge 66 is provided in an end region 71 of a portion 48 running ahead, the second folding edges 68, 70 are provided in a portion 48 running behind, wherein the adhesive region 56 and the predetermined tearing region 50 are provided between the first folding edge 66 and the second folding edge 68 and the adhesive region 56 runs ahead of the predetermined tearing region 50. The first folding edge 66 and the second folding edge 68 furthermore define a first lateral region 72 between one another and the second folding edge 68 and the third folding edge 70 define a second lateral region 74 between one another.

If the enveloping material 42 is wound on the supply roll 40, the folding regions 52 are folded together such that the predetermined tearing region 50 and the adhesive region 56 are arranged between the lateral regions 72, 74, specifically such that the adhesive components 58, 60 come to rest on one another. The second adhesive component 60 is in the form of a silicone-type material which adheres only lightly to the first adhesive component 58 in the folded state of the folding region 54 such that the folding region 54 is held together by the first and second adhesive components 58, 60 in a state wound on the supply roll 40.

If the bale 12 has been completely wrapped with enveloping material 42, as is illustrated in FIGS. 4 and 5, the rotating bale 12 acts on the enveloping material 42 such that it exerts a force acting in the delivery direction F thereon, the force exceeding an adhesive force between the first and second adhesive components 58, 60 and unfolding the folding region 54. The first adhesive component 58 now passes into abutment with the enveloping material 42 enveloping the bale 12 and forms a firmly adhesive connection therewith.

The force applied by the rotating bale 12 now acts on the predetermined tearing region 50 and separates the portions 48 from one another along the perforation line 52. The bale 12 is now enveloped with enveloping material 42 and can be discharged from the pressing chamber 26.

The enveloping material 42 furthermore has, in a starting region 76 of each portion, a row of entrainers 78 behind, a row of entrainers 78 in the form of substantially round cutouts 80. The entrainers 78 extend transversely across the width B of the enveloping material 42 and adjoin, at a distance, the predetermined tearing region 50 that runs ahead with respect to the delivery direction F, and are provided in front of the second folding edge 68, or between the predetermined tearing region 50 running ahead and the second folding edge 68. Each portion of the enveloping material 42 can comprise only one single row of entrainers.

By way of the entrainers 78, the enveloping material 42, or a starting region 76 of each portion, can be grasped for example by the bale 12 or by material forming the bale 12 by stalks of harvested material of the straw or hay type.

Furthermore, the row of cutouts 80 can also serve as a safety device in the event that no separation takes place along the predetermined tearing region 50 or the portion 48 enveloping the bale 12 is too short. Alternatively, separation can now take place along the cutouts 80 arranged in a row and thus wrapping of the bale 12 with a second portion 48 can be prevented.

If the enveloping device 38 has a feed device 82 (shown by way of indication in FIG. 1) for the enveloping material 42, for example, a feed lever provided in a pivotable manner on the enveloping device 38. The feed lever can interact with the entrainer 78, or engage in the or one of the cutout(s) 80, in order to guide the enveloping material 42 onto the feed roll 46 or the bale 12. Interaction of the feed device 82 with the entrainer 78 and engagement in the or one of the cutout(s) 80 can further determine the position of the enveloping material 42 or of that portion 48 of the enveloping material 42 that is grasped by the feed lever with respect to the feed device 82 and thus the enveloping device 38 or the bale 12. This can contribute toward the enveloping material 42 or the portion 48 for enveloping the bale 12 being positioned such that the length of the portion 48 that follows onto the feed device is at least substantially the same for each enveloping operation.

It should be noted here that the entrainers 78 can also be provided on conventional or known enveloping materials, on enveloping materials that differ from the above-described enveloping material (e.g., films), or an above-described enveloping material 42 does not necessarily have to be provided with the entrainers 78.

Reference is now made in particular to FIGS. 2 to 6, in which a braking device 84 for an enveloping material 42 is shown. The braking device 84 can be used on an above-described enveloping device or on a conventional enveloping device or baler or in conjunction with an above-described and a conventional enveloping material, such as a net or film.

According to the present embodiment, the braking device 84 is operatively connected to a control device 86 of the baler 10 and has a sensor 88, of the optical sensor 88 type, which can detect whether a marking 92 provided in a peripheral region 90 of the enveloping material 42 is located in a sensing region of the sensor 88.

If the sensor 88 identifies that a marking 92 is present in its sensing region, it transmits this information to the control device 86, which accordingly activates the braking device 84 such that a braking means 94 of the braking device 84 is applied to the enveloping material 42 in order to brake the latter. The marking 92 is arranged on the enveloping material 42 such that it indicates to the braking device 84 that it should brake the enveloping material 42 when the starting region 76 of a portion 48 running behind a portion 48 enveloping a bale 10, or the end thereof that is now free following severing of the portion 48 enveloping the bale 10 along the predetermined tearing region 50 takes up a predetermined position (see FIG. 6). In particular, the portion 48 is braked such that its starting region 76, or its free end, is arranged in the feed gap 44 such that a distance A between the starting region 76 and the pressing chamber 26 is at least substantially the same at the start of each enveloping operation. According to the illustration in FIG. 6, the enveloping material 42, or the starting region 76, is further held in abutment with the feed roll 44 by a directing means 96 which is not required for the desired action of the braking device.

In this way, the braking device 84 contributes toward each bale 10 being enveloped with an at least substantially identical quantity of enveloping material 42, or, in the case of an above-described enveloping material 42 subdivided into portions 48, or an enveloping material 42 having predetermined tearing regions 50, being enveloped with exactly one portion 48, or each portion 48 being positioned appropriately for enveloping a bale.

Alternatively, a braking device 84 can also be controlled, for example, in a temporally cyclical manner. However, it is also conceivable for sensor means 88 to be provided which determine the length of the enveloping material 42 already drawn from the supply roll 40. The braking device 84 can also have a lever device (not shown), however, which interacts with a marking 92 of the cutout type, into which a mechanical braking element in the form of a lever element provided in an articulated manner on the enveloping device 38 can engage in order to brake the enveloping material 42. After the enveloping material 42 has been separated, the braking element can pivot or be pivoted for example back into a starting position in which it does not act on the enveloping material 42. The braking device 84 does not necessarily have to be controlled by a control device. Provision can also be made for a drive (not shown), e.g., a drive of the supply roll 40, to be braked or deactivated in a corresponding manner.

The separation of the portions 48 along the predetermined tearing region 50 can take place without the aid of further auxiliaries, in particular without the use of a separating device or cutter arrangement. Furthermore, or alternatively, a force acting on the predetermined tearing region 50 can be increased or an additional force can be applied by the braking device 84 shown at the end of an enveloping operation, however.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An enveloping material for a baler for enveloping a lateral surface of a bale, the enveloping material comprising:
  a film extending in a delivery direction and having a width transverse to the delivery direction;
  a perforation line extending across the width of the film and operable to separate the film into portions in response to a force applied to the film in the delivery direction;
  wherein each portion of the film includes only a single row of entrainers in the film extending across the width of the film and positioned behind the perforation line with respect to the delivery direction;
  wherein the film includes a first folding edge positioned ahead of the perforation line relative to the delivery direction, a second folding edge positioned behind the perforation line and the single row of entrainers relative to the delivery direction, and a third folding edge positioned behind the second folding edge relative to the delivery direction; and
  wherein the single row of entrainers includes a plurality of cutouts in the film configured to be grasped by stalks of material of the bale to guide the film onto the bale.

2. The enveloping material set forth in claim 1, wherein each of the plurality of cutouts is formed to define one of a round opening, an oval opening, or an elongate opening through the film.

3. A baler for forming a bale of harvested material, comprising:
  a housing;
  a plurality of wheels for supporting the housing;
  a first portion of the housing comprising a receiving apparatus for receiving the harvested material;
  a pressing chamber partially surrounded by the first portion and configured to receive the harvested material from the receiving apparatus; and
  an enveloping device equipped with a supply roll of enveloping material;
  wherein, the enveloping material includes:
    a film extending in a delivery direction and having a width transverse to the delivery direction;
    a perforation line extending across the width of the film and operable to separate the film into portions in response to a force applied to the film in the delivery direction;
    wherein each portion of the film includes only a single row of entrainers in the film extending across the width of the film and positioned behind the perforation line with respect to the delivery direction;
    wherein the film includes a first folding edge positioned ahead of the perforation line relative to the delivery direction, a second folding edge positioned behind the perforation line and the single row of entrainers relative to the delivery direction, and a third folding edge positioned behind the second folding edge relative to the delivery direction; and
    wherein the single row of entrainers includes a plurality of cutouts in the film configured to be grasped by stalks of material of the bale to guide the film onto the bale.

4. The baler of claim 3, further comprising a second pivotal portion of the housing at least partially surrounding the pressing chamber.

5. The baler of claim 4, wherein the second portion comprises an open state in which an opening is defined through which the bale is pressed.

6. The baler of claim 4, further comprising a plurality of pressing rollers disposed parallel to one another, wherein each of the plurality of rollers includes an axis of rotation that lies on a circular arc with the second portion in a closed state.

7. The baler of claim 4, further comprising a feed gap through which the enveloping material is fed by the supply roll to the pressing chamber.

8. The baler of claim 7, further comprising:
  a drive; and
  the feed roll disposed beneath the feed gap, where the feed roll is rotatably driven via the drive.

9. The baler set forth in claim 3, wherein each of the plurality of cutouts is formed to define one of a round opening, an oval opening, or an elongate opening through the film.

* * * * *